United States Patent
Slack et al.

(12) 
(10) Patent No.: US 6,623,669 B1
(45) Date of Patent: Sep. 23, 2003

(54) METHOD AND APPARATUS FOR CASTING LENSES

(75) Inventors: Dale E. Slack, Alpharetta, GA (US);
Karl Zawoy, Alpharetta, GA (US);
Matt A. Michel, Greenville, SC (US);
Dave Smith, Greenville, SC (US);
Andy Humphries, Greenville, SC (US);
Rick Conard, Greenville, SC (US);
Richard Barrett, Greenville, SC (US)

(73) Assignee: Rodenstock North America, Inc., Hayward, CA (US)

( * ) Notice: Subject to any disclaimer, the term of this patent is extended or adjusted under 35 U.S.C. 154(b) by 390 days.

(21) Appl. No.: 09/606,095

(22) Filed: Jun. 16, 2000

(51) Int. Cl.7 ............................................... B29D 11/00
(52) U.S. Cl. .................. 264/2.5; 118/695; 264/1.38; 425/150; 425/162; 425/169; 425/174.4; 425/808
(58) Field of Search ................. 425/808, 150, 425/162, 169, 161, 173, 174.4; 264/1.1, 1.7, 1.36, 1.38, 2.5; 118/695; 427/162, 164

(56) References Cited

U.S. PATENT DOCUMENTS

| 6,068,464 A | 5/2000 | Su et al. ............... 425/190 |
| 6,082,987 A | 7/2000 | Su et al. ............... 425/150 |
| 6,099,763 A | 8/2000 | Su et al. ............... 264/2.2 |
| 6,099,764 A | 8/2000 | Su et al. ............... 264/2.2 |
| 6,103,148 A | 8/2000 | Su et al. ............... 264/1.38 |
| D434,050 S | 11/2000 | Su ....................... D15/135 |

FOREIGN PATENT DOCUMENTS

| EP | 183 324 | * | 6/1986 |
| EP | 318 164 | * | 5/1989 |

* cited by examiner

Primary Examiner—Mathieu D. Vargot
(74) Attorney, Agent, or Firm—Sutherland Asbill & Brennan LLP

(57) ABSTRACT

An apparatus for manufacturing a lens with a predetermined prescription from a number of lens molds, a gasket, and a source of a fluid material. The apparatus includes a device for selecting a first lens mold and a second lens mold based upon the prescription, a device for positioning the lens molds within the gasket, a device for inserting an amount of the fluid material within the gasket and between the molds, a device for curing the fluid material so as to form the lens, and a device for advancing the lens molds along a predetermined path through the selecting device, the positioning device, the fill device, and the cure device.

54 Claims, 15 Drawing Sheets

METHOD AND APPARATUS FOR CASTING LENSES

FIELD OF THE INVENTION

The present invention relates generally to an automated manufacturing system and more particularly relates to a method and an apparatus for manufacturing optical lenses to order in an efficient, high-speed manner.

BACKGROUND OF THE INVENTION

The traditional manufacturing and distribution chain for a lens used in consumer eyeglasses generally includes a manufacturer, a laboratory, and a retail outlet. The manufacturer typically makes a lens blank and then ships the blank to the laboratory. The blank is an unfinished lens. The laboratory generally surfaces and edges the lens in the appropriate fashion for a given prescription and then ships the lens to the retail outlet. The retail outlet cuts and fits the lens to the appropriate frame. The retail outlet is generally a doctor or an eye care outlet. The retail outlet both orders the lens from the laboratory or the manufacturer and then fits the lens and the frame as appropriate for the consumer.

Any of the parties in the manufacturing and distribution chain may stockpile certain types of lenses. Certain common prescriptions may be manufactured in bulk and kept in supply. In most cases, these lenses are single vision lenses, i.e., lenses with only one viewing power. Other types of prescriptions, however, may not be as common and may be made only on an as-needed basis. Further, other types of lenses, such as progressive lenses (bi-focal lenses without lines) are generally made on demand given the differing strengths involved in the single lens. In other words, the progressive lens will have surfaces of different curvature as required for distance and reading.

These specialty lenses generally are more expensive in that the manufacturing process is both time and labor intensive. Further, these lenses cannot be easily inventoried because of the multiple permutations of strengths in a given lens. This is particularly due to the condition of astigmatism. Astigmatism requires the proper orientation of a toric curve on the back of the lens relative to the eye. Because the additional power cylinder also must align properly, it is not practical to maintain an inventory of multi-focal lenses. Multi-focal lenses therefore generally are produced by grinding and polishing a semi-finished blank.

Competition in this segment of the lens manufacturing and distribution market is largely based on the ability to produce high-quality specialty lenses while attempting to minimize the time and labor involved. There is a need, therefore, for a flexible, high-speed specialty lens manufacturing process that can produce lenses in an efficient manner.

SUMMARY OF THE INVENTION

The present invention thus provides an apparatus for manufacturing a lens with a predetermined prescription from a number of lens molds, a gasket, and a source of a fluid material. The apparatus includes a means for selecting a first lens mold and a second lens mold based upon the prescription, a means for positioning the lens molds within the gasket, a means for inserting an amount of the fluid material within the gasket and between the molds, a means for curing the fluid material so as to form the lens, and a means for advancing the lens molds along a predetermined path through the selecting means, the positioning means, the fill means, and the cure means. The apparatus also may include a control system for operating the selecting means, the positioning means, the fill means, and the cure means.

Specific embodiments of the present invention may include the use of a personal computer with the control system. The control system further may include a database and a data input and output means.

The selecting means may include a conveyor advancing along the predetermined path with one or more transport pallets positioned thereon. The selecting means also may include a storage carousel for storing the lens molds and an automated access arm for transporting the lens molds from the storage carousel to the pallet on the conveyor. The access arm may be a pick and place arm. The access arm may include a gantry, a number of gripper heads, and a number of gripper arms for gripping the lens molds. Each of the gripper heads may include an optical device for reading the indicator. The optical device may include a fiber optic sensor. The fiber optic sensor confirms that the lens mold is in the gripper arms.

The positioning means may include a positioning station with an optical device. The lens molds may have a tic mark or a positioning mark thereon. The optical device may be a camera-based vision system so as to view the tic mark positioned on the lens molds. The optical device may be positioned within a positioning stage. The positioning stage may rotate the lens molds according to the viewed position of the tic mark. The positioning means also may include an assembly station with a retractable assembly stage positioned within a gasket mount. The assembly stage inserts the first lens mold within the gasket at a predetermined depth and then inserts the second lens mold within the gasket at a second predetermined depth. The positioning means also may include a gasket supply with a number of the gaskets.

The positioning means may include one or more access arms for maneuvering the first lens mold, the second lens mold, and the gasket therethrough. A first access arm may position the lens molds on the positioning station, a second access arm may maneuver the lens molds between the positioning station and the assembly station, and a third access arm may maneuver the gasket between the gasket supply and the assembly station and also remove the lens molds and the gasket from the assembly station. The access arms may move along a gantry. Each access arm may have a pair of gripper arms for gripping the lens molds and the gasket.

The inserting means may include one or more fill stations with a needle for piercing the gasket and a variable speed pump for delivering the fluid material. The inserting means also may include one or more cure stations with one or more radiation sources. The radiation sources may be ultraviolet light or visible light sources. Shutters may cover the radiation sources. The shutters may operate independently of one another to provide variable cure cycles from the front and the back.

The present invention may further include a means for removing the lens and the lens mold from the gasket. The removing means may include a pair of movable degasketing arms for stretching the gasket and an extendable plunger for pushing the lens and the lens molds out of the gasket. The invention may further include a means for separating the lens and the lens mold via a number of heating and cooling stations. The invention may further include a means for coating the lens with a scratch resistant treatment, a means for verifying the prescription of the lens, and a means for cleaning the lens molds.

A further embodiment of the present invention may provide a device for identifying and orienting a lens mold as the mold advances along a conveyor positioned along a predetermined path. The lens mold may have an identification indicator thereon and a positioning mark thereon. The device may include an access arm to grasp the lens mold, an optical device to read the identification indicator and the positioning mark, and a printer to print a further indicator on the lens mold at a predetermined location thereon. The device may further include a control system for controlling the access arm, the optical device, and the printer. The optical device may include a bar code reader to read the indicator and a camera-based vision system to view the positioning mark. Alternatively, the bar code could be read by the camera-based vision system. The access arm includes one or more gripper arms such that the gripper arms can grasp and rotate the lens mold. The printer may be an ink jet printer.

The method of the present invention provides a method for manufacturing a lens with a predetermined prescription from a number of lens molds, a gasket, and a source of a fluid material. The method includes the steps of selecting a first mold and a second mold based upon the predetermined prescription, advancing the first lens mold along a predetermined path, positioning the first lens mold within the gasket, advancing the second lens mold along the predetermined path, positioning the second lens mold within the gasket, advancing the first lens mold, the second lens mold, and the gasket along the predetermined path, inserting a predetermined amount of the fluid material within the gasket and between the lens molds, and curing the fluid material so as to form the lens based upon the predetermined prescription.

A further embodiment of the present invention provides a storage and retrieval station for use with a number of lens molds for making lenses. The storage and retrieval station may have a control system, a conveyor controlled by the control system, a storage rack for storing the lens molds positioned adjacent to the conveyor, and an access arm controlled by the control system for transporting a predetermined lens mold from the storage rack to the conveyor. The access arm may have an optical device thereon so as to confirm that the access arm has picked up one of the lens mold from the storage rack. The storage rack may include a rotatable storage carousel. The control system controls the rotatable storage carousel in coordination with the access arm. The access arm may include a gantry, a gripper head, and a pair of gripper arms so as to acquire the predetermined lens mold. The optical device may include a fiber optic sensor.

A further embodiment of the present invention provides an assembly apparatus for positioning a first lens mold and a second lens mold into a gasket so as to form a lens of a predetermined prescription. The lens molds each may include a positioning mark thereon. The apparatus may further include an positioning station for detecting the positioning mark, a gasket supply with the gasket therein, an assembly station for positioning the first lens mold and the second lens mold within the gasket, and an access arm system for transporting the first lens mold, the second lens mold, and the gasket along the predetermined path. The assembly apparatus further may include a control system for operating the positioning station, the assembly station, and the access arm system.

The positioning station may include an optical device for viewing the positioning mark on the lens mold. The optical device may include a camera-based vision system. The positioning station also may include a positioning stage surrounding the optical device. The positioning station may rotate the lens molds as directed by the control system based upon the view of the positioning mark.

The assembly station may include a gasket mount sized to support the gasket and an assembly stage positioned within the gasket mount. The assembly stage may position the first lens mold and the second lens mold into the gasket at a depth as determined by the control system. The positioning of the molds may be based upon the predetermined prescription. The access arm system may include a gantry and a number of access arms. The first access arm may position the lens molds on the positioning station, the second access arm may maneuver the lens molds between the positioning station and the assembly station, and the third access arm may maneuver the gasket between the gasket supply and the assembly station and also may remove the lens molds and the gasket from the assembly station. Each of the access arms may include a number of gripper arms to grip the lens molds and the gasket.

A further embodiment of the present invention may include a device for filling a mold with a fluid material and curing the fluid material. The device may include a fill station with a pump and an insertion device and a cure station with a number of radiation sources and a number of shutters. Each of the shutters may operate independently of one another. A control system may control the fill station and the cure station. The insertion device may include a non-coring needle. The pump may include a multispeed positive displacement pump. The radiation sources may be ultraviolet light sources, visible light sources, or infrared light sources. A movable bracket may maneuver the molds between the fill station and the cure station.

A further embodiment of the present invention may provide a device for removing a gasket from around a mold. The gasket may have a number of support brackets. The device may have a plunger capable of movement in a first direction and a number of degasketing arms surrounding the plunger. The degasketing arms may be capable of movement in a second direction. The degasketing arms may include a number of gripper arms to grip the support brackets of the gasket such that the degasketing arms stretch the gasket in the second direction while the plunger forces the mold out of the gasket in the first direction. The device may further include a control system for controlling the plunger, the degasketing arms, and the gripper arms. An access arm may remove the mold from the plunger.

Other objects, features, and advantages of the present invention will become apparent upon reading the following detailed description of the invention when taken in conjunction with the drawings and the appended claims.

BRIEF DESCRIPTION OF THE DRAWINGS

FIG. 17 is a top plan view of the degasketing station of the present invention.

DETAILED DESCRIPTION OF THE INVENTION

Figure 1:
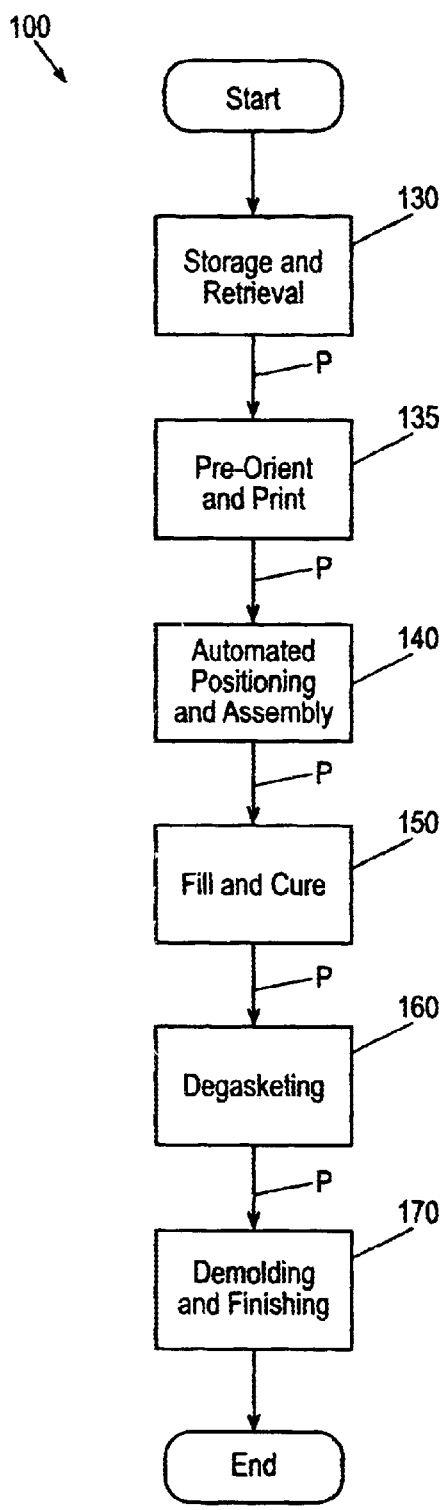
FIG. 1 is a flow chart showing the steps and stations of the present invention.

Referring now to the drawings in which like numbers refer to like parts throughout the several views, FIGS. 1 through 21 shown an automatic casting system 100 of the present invention. The automatic casting system 100 includes a number of different stations or steps in the overall casting process. FIG. 1 is a high-level flow chart showing the steps involved in the manufacture of a lens 110. Each step in the flow chart represents a different station in the automatic lens casting system 100 as a whole. As is shown, the automatic casting system 100 may include, but is not limited to, a control system 120, a storage and retrieval station 130, a pre-orient and print station 135, an positioning and assembly station 140, a fill and cure station 150, a degasketing station 160, and a demolding and finishing station 170. Each of these steps and stations will be described in more detail below.

The Control System

Figure 2:
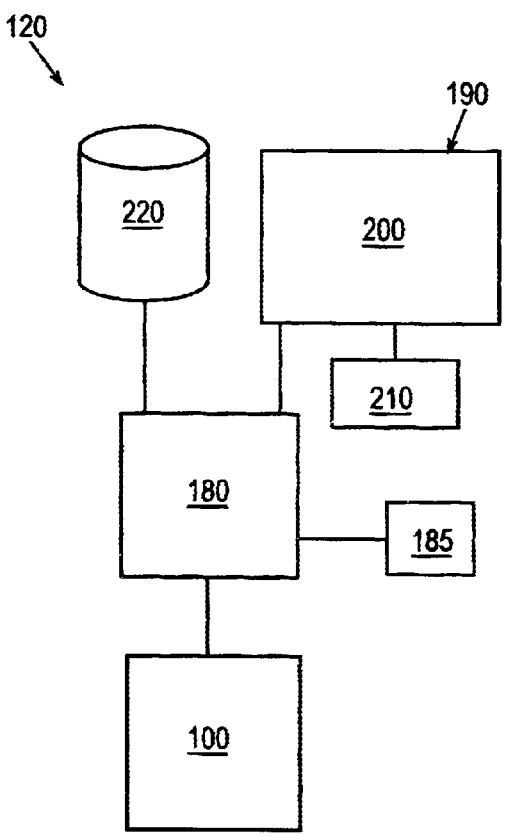
FIG. 2 is a schematic diagram of the control system of the present invention.

The control system 120 contains information on the manufacture of millions of different lens prescriptions. As is described in more detail below, the control system 120 selects the appropriate lens molds and also determines a number of other manufacturing parameters required for the desired prescription. As is shown in FIG. 2, the control system 120 may include a conventional personal computer 180 as well as one or more programmable logic controllers 185. Alternatively, other types of conventional control devices may be used. The personal computer 180 sets, monitors, and controls the various stations of the system 100 as a whole. Preferably, the personal computer 180 may be programmed by software running on the QNX operating system or by similar types of software. The QNX operating system is a real-time, multitasking operating system that is UNIX compatible. For example, the AART software or the Flastflex software provided by Advanced Automation of Greenville, S.C. may be used.

The control system 120 preferably includes at least one data entry station 190 with a monitor 200 and a keyboard 210 or other types of conventional data input/output devices. A conventional database 220 also may be provided. The manufacturing parameters for each lens 110 prescription may be found in the database 220 or the parameters may be encoded on each mold as described in more detail below.

The Storage and Retrieval Station

Figure 3:
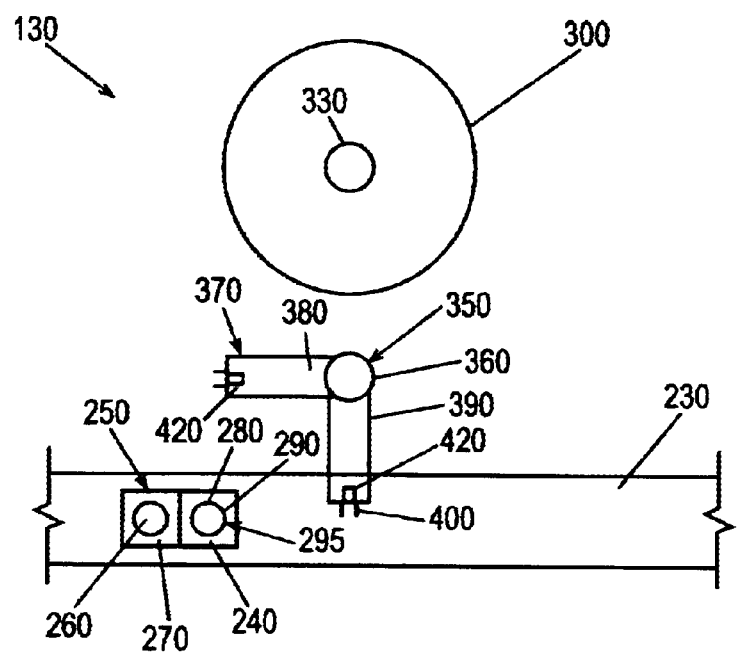
FIG. 3 is a top plan view of the storage and retrieval station of the present invention.
Figure 4:
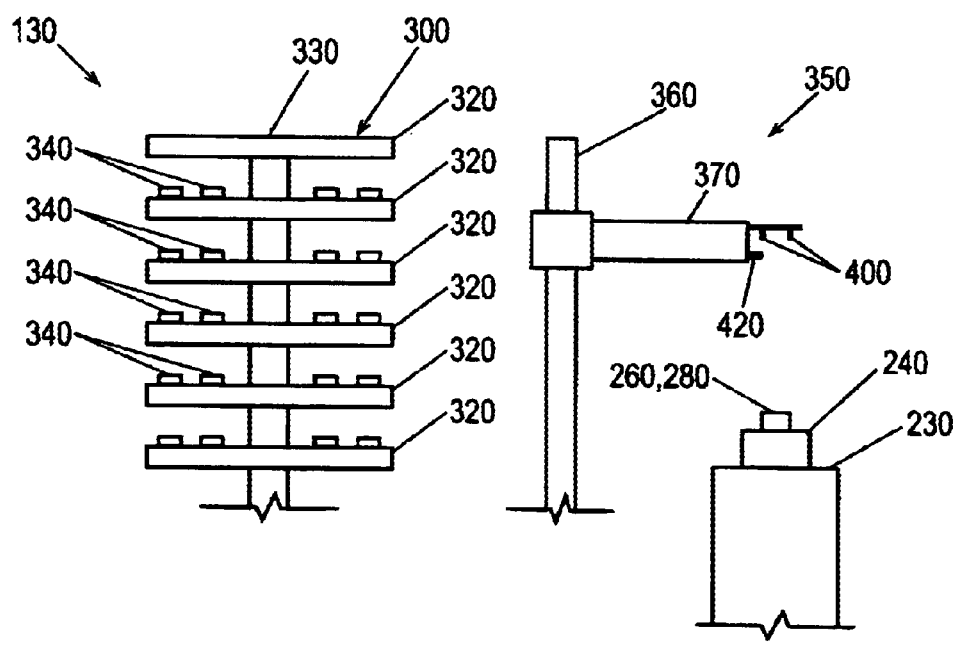
FIG. 4 is a side plan view of the storage and retrieval station.
Figure 5:
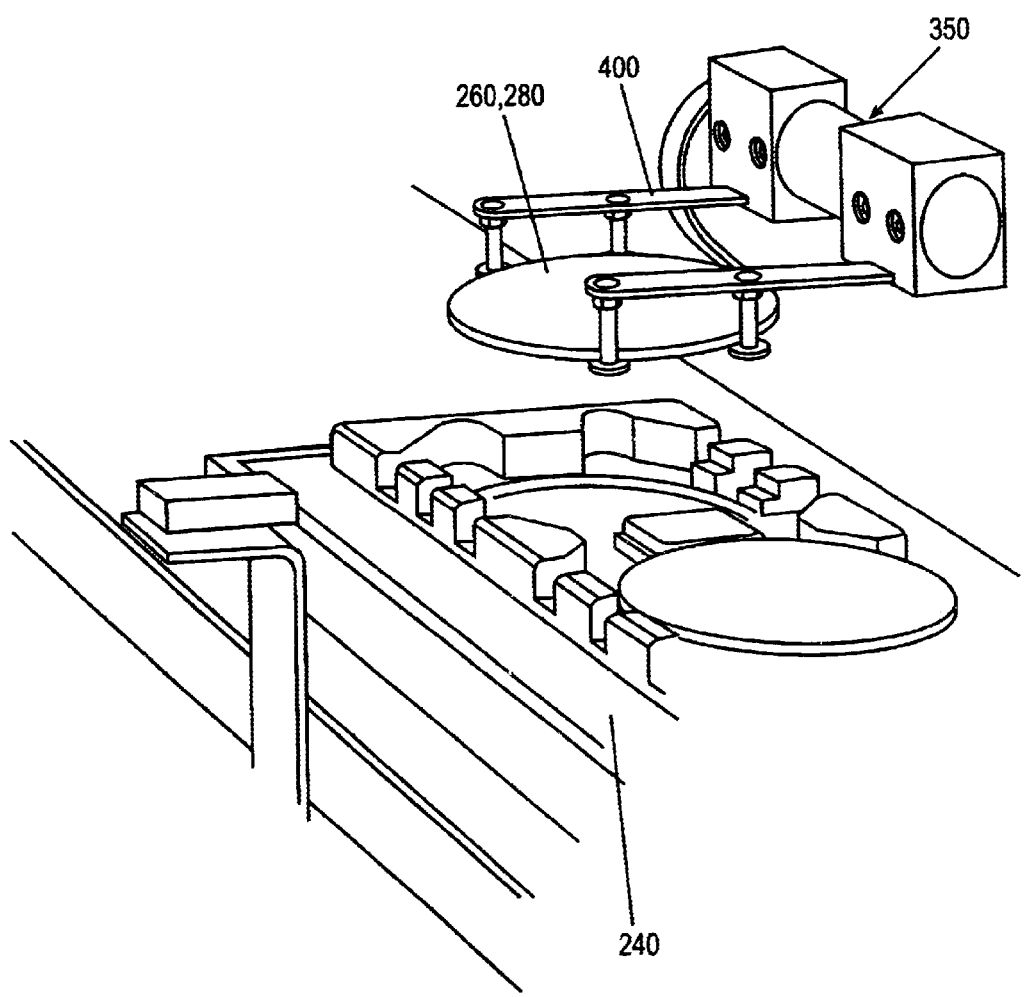
FIG. 5 is a perspective view of the access arm placing a lens mold into a pallet for transport within the storage and retrieval station.

The storage and retrieval station 130 is positioned along a predetermined path P within the system 100. The predetermined path P is the path taken through each of the stations in the system 100 as a whole. As is shown in FIGS. 3–5, the storage and retrieval system 130 includes a conveyor system 230 with a conventional conveyor belt or a similar type of driven advancement system. The conveyor system 230 advances along the predetermined path P. Positioned on the conveyor system 230 may be one or more pallets 240. Each pallet 240 preferably has two lens mold storage basins 250. A first lens mold 260 may be positioned within a first basin 270 and a second lens mold 280 may be positioned within a second basin 290. The pallet 240 may have a radio frequency tag 295 thereon so as to identify and track the pallet 240 as it travels through the system 100. The pallet 240 may be made out of any conventional non-metallic material so as to minimize or eliminate any scratches or damage to the lens molds 260, 280. The pallet 240 also may be anti-static to avoid the accumulation of dust. The lens molds 260, 280 are generally made out of glass, plastic, or other known types of casting materials. Each pair of the lens molds 260, 280 combine to provide a lens 110 of a given prescription.

The storage and retrieval system 130 further includes a storage carousel 300 for storing a plurality of the lens molds 260, 280. The storage carousel 300 is preferably a circular structure with a number of trays 320 mounted on a central spindle 330. The storage carousel 300 may be motorized so as to rotate about the central spindle 330. Rotation of the storage carousel 300 is controlled by the control system 120. Positioned on each of the trays 320 may be a plurality of mold storage locations 340. Each of the plurality of the lens molds 260, 280 is stored in these locations 340.

The carousel 300 cooperates with an automated access arm 350 or a "pick and place" arm. The access arm 350, as described here and below, preferably is as multiple axes, servomotor driven robotic arm. The access arm 350, however, also may be operated by electrical, pneumatic, or mechanical means as is known to those skilled in the art. A preferred access arm 350 may use one or more linear servos manufactured by NSK Ltd. of Tokyo, Japan. The access arm 350 is positioned on a vertical gantry 360. The access arm 350 includes at least two gripper heads 370, a first gripper head 380 and a second gripper head 390. The gripper heads 370 may include a pair of gripper arms 400. The gripper arms 400 are capable of reciprocating motion so as to pick up and drop off one of the plurality of lens molds 260, 280. The access arm 350 is capable of movement in at least two axes. The access arm 350 may rotate about the gantry 360 in the horizontal plane and also move up and down the gantry 360 in the vertical plane. The movement of the access arm 350 is controlled by the control system 120. Each of the gripper heads 370 also may includes an optical device 420 such as a fiber optic sensor or other types of conventional recognition devices.

The control system coordinates movement of the conveyor 230, the carousel 300, the access arm 350, and the gripper arms 400 such that a specific lens mold 260, 280 may be removed from its mold storage location 340 on the carousel 300 by the access arm 350 and placed in the correct basin 270, 290 of the pallet 240. The first gripper head 380 may remove one of the lens molds 260, 280 from the pallet 240 for return to the storage carousel 300 while the second gripper head 390 places another of the lens molds 260, 280 on the pallet 240. The optical device 420 ensures that a lens mold 260, 280 is in fact in position within the gripper arms 400 before the access arm 400 proceeds.

The control system 120 remembers which lens mold 260, 280 is positioned within which mold storage location 340 on the carousel 300. It is not necessary to have the lens molds 260, 280 assigned to a specific position within the mold storage location 340. Rather, the control system 120 tracks where each lens mold 260, 280 is placed. The control system 120 also can track information such as the number of uses for a mold 260, 280 or which specified molds 260, 280 were used to make a given lens 110. Also easily tracked is the distribution of prescriptions, the lifetime of certain mold geometries, which is helpful for ordering replacement molds 260, 280, and other types of use information. Each lens mold 260, 280 may have a unique identification number that is unrelated to its geometry for tracking purposes.

Pre-Orient and Print Station

Figure 6:
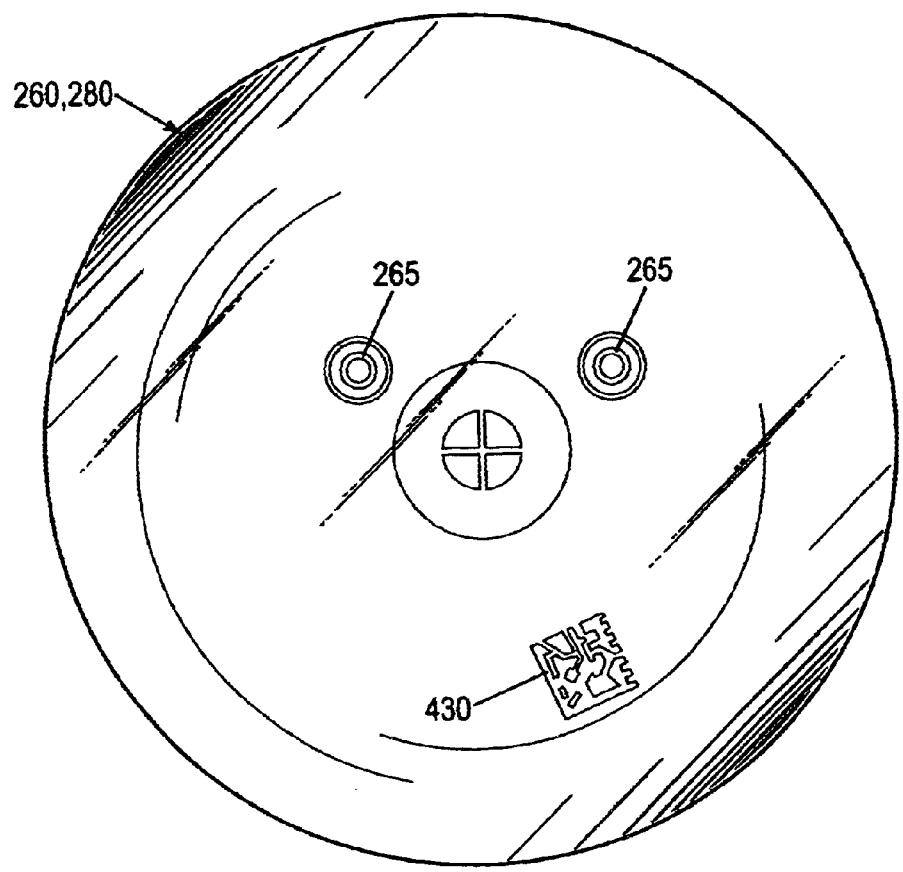
FIG. 6 is a perspective view of a lens mold with the indicator and the tic mark.

The pallet 240 with the lens molds 260, 280 therein then continue down the conveyor system 230 along the predetermined path P to the pre-orient and print station 135. The lens molds 260, 280 positioned on the pallet 240 may be identified by the radio frequency tag 295. Likewise, the expected prescription also may be identified by the tag 295. Each of the plurality of the lens molds 260, 280 may have an indicator 430 positioned thereon. The indicator 430 may take the form of a bar code and/or a humanly readable legend. The indicator 430 may identify the particular lens mold 260, 280 to the control system 120 and may further provide information on the nature of the lens mold 260, 280 such as its prescription information and manufacturing parameters. One or more tic marks 265 also may be present on the lens molds 260, 280 so as to determine the orientation of the mold 260, 280. FIG. 6 shows a perspective view of the lens mold 260 with the indicator 430 and the tic marks 265.

Figure 7:
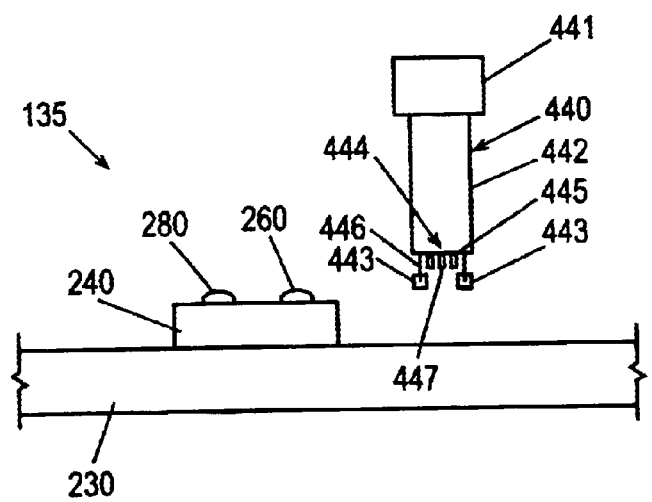
FIG. 7 is a side plan view of the pre-orient and identification station.

The pre-orient and print station 135 is shown in FIG. 7. The pre-orient and print station 135 is positioned across the conveyor 230 and includes an access arm 440 that is positioned upon a gantry 441. The access arm 440 may have an extendable cylinder 442 so as to extend and retract in the vertical direction and a number of gripper arms 443 to grab and release the lens molds 260, 280. The gripper arms 443 may operate largely in the horizontal plane so as to grab the lens molds 260, 280 from the pallet 240. The gripper arms 443 also may be capable of rotating the lens molds 260, 280 to a desired orientation. The access arm 440 is controlled by the control system 120.

The access arm 440 also may include an optical device 444 and a printer 445 positioned thereon. The optical device 444 may included a barcode reader 446 or a similar type of optical recognition device and/or a vision system 447 such as a camera-based recognition device. The printer 445 may take the form an inkjet printer or a similar device. The printer 445 may print a further indicator 448 on one of the lens molds 260, 280.

As the pallet 240 reaches the pre-orient and print station 135, the extendable cylinder 442 of the access arm 440 extends downward. The gripper arms 443 grasp the first lens mold 260 and remove it from the pallet 240. The bar code reader 446 of the optical device 444 positioned on the access arm 440 reads the indicator 430 on the lens mold 260 to inform the control system 120 that the correct mold 260 is present. The bar code reader 446 also may obtain the manufacturing parameters from the indicator 430. The access arm 440 returns the first lens mold 260 to the pallet 240 and then removes the second lens mold 280. The bar code reader 446 again reads the indicator 430 thereon and informs the control system 120 that the correct mold 280 is present. Again, the optical device 444 also may obtain the manufacturing parameters from the indicator 430.

The vision system 447 of the optical device 444 also may view the tic marks 265 on the lens molds 260, 280 to determine their location and the orientation of the lens molds 260, 280. Alternatively, the bar code could be read by the camera-based vision system. The gripper arms 443, under the control of the control system 120, then may rotate the lens molds 260, 280 to prepare them for printing. The purpose of orienting the lens molds 260, 280 is to have the further indicator 448 printed on the "top" of the mold 260, 280 such that when the further indicator 444 is transferred to the lens 110, the further indicator 448 is likely in a location that will be ground off when the lens 110 is fitted to the consumer's frame. The further indicator is generally printed on the second lens mold 280. The gripper arms 443 thus rotate the lens mold 280 based upon the position of the tic marks 265 as viewed by the vision system 447.

Once the gripper arms 443 have rotated the lens mold 280, the printer 445 is activated. The ink used with the printer 445 is selected to allow the further indicator 448 to remain on the lens mold 280 at least through the curing process. The ink preferably has a strong affinity for a polymeric lens material such that the further indicator 448 is transferred to the lens 110. The further indicator 448 may take the form of a machine-readable barcode and/or humanly readable digits, graphics, letters, or any combination thereof. A preferred marking process is described in U.S. patent application Ser. No. 09/409,318 entitled "*Method of Inventory Control from Molded Lenses*". The further indicator 448 also may be printed on the first lens mold 260 if desired. After printing, the access arm 440 returns the second lens mold 280 to the pallet 240.

The Positioning and Assembly Station

Figure 8:
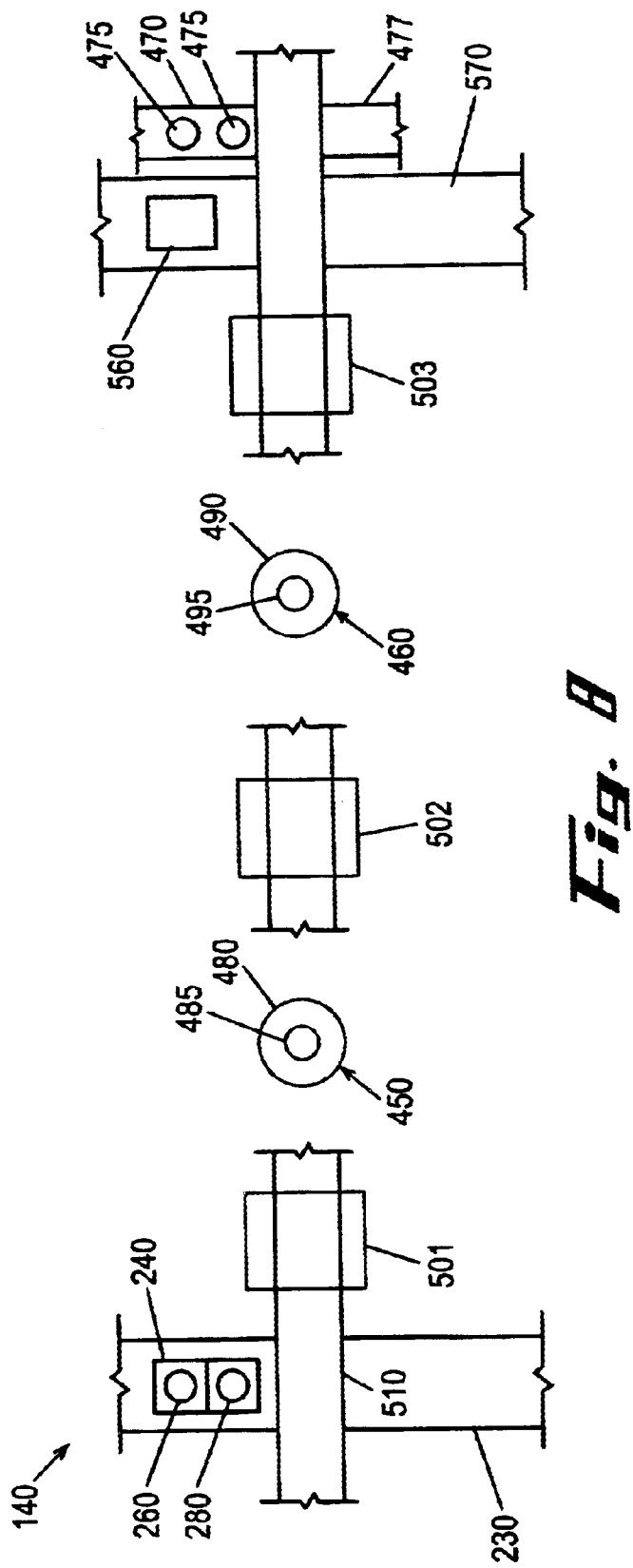
FIG. 8 is a top plan view of the positioning and assembly station of the present invention.
Figure 9:
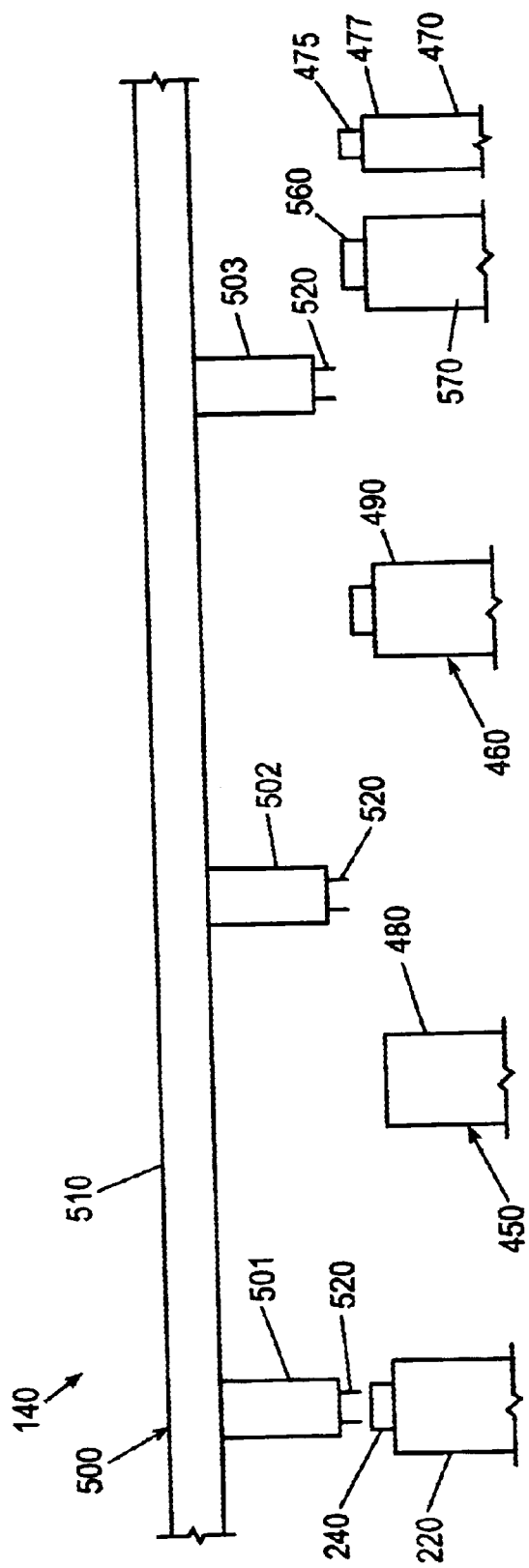
FIG. 9 is a side plan view of the positioning and assembly station.
Figure 10:
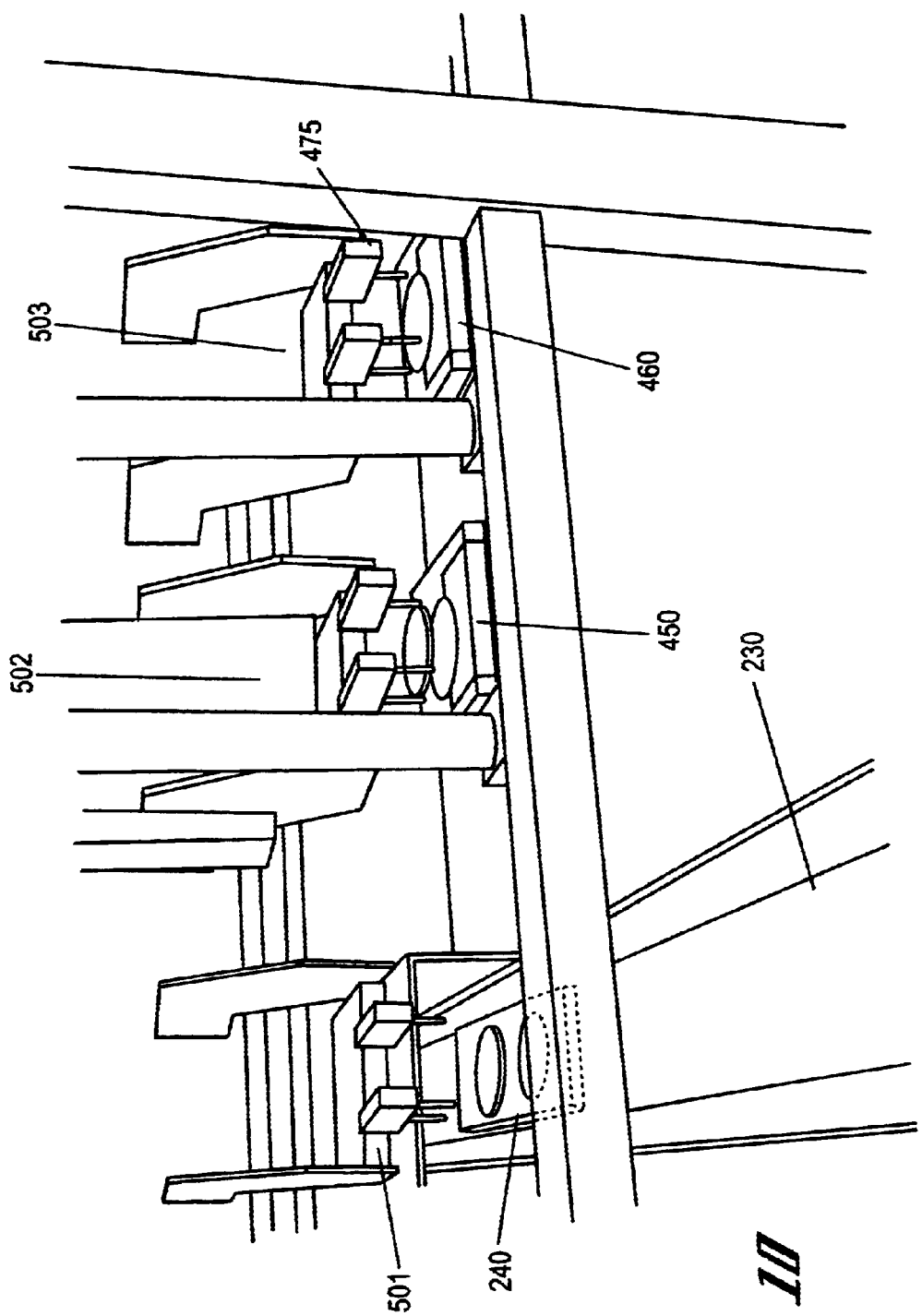
FIG. 10 is a perspective view of the positioning and assembly station.

The pallet 240 with the lens molds 260, 280 therein then continues down the conveyor system 230 along the predetermined path P to the automated positioning and assembly station 140. The automated positioning and assembly station 140 is shown in FIGS. 8–10. The station 140 may include a positioning station 450, an assembly station 460, and a gasket supply 470 with a plurality of gaskets 475. The same gasket 475 in terms of shape, size, and materials is used herein for each prescription. The positioning station 450 may include a positioning stage 480 surrounding an optical device 485. The optical device 485 may be a vision system such as a camera-based detection or recognition device. The positioning stage 480 may extend and retract in the vertical direction under the direction of the control system 120. The assembly station 460 may include a gasket mount 490 surrounding an assembly stage 495. The assembly stage 495 also may extend and retract in the vertical direction within the gasket mount 490 under the direction of the control system 120. The gasket supply 470 may include a conveyor 477 or other type of device that positions the gaskets 475 in a predetermined location.

The positioning station 450, the assembly station 460, and the gasket supply 470 are accessed by three automated access arms 500, a first access arm 501, a second access arm 502, and a third access arm 503. The access arms 500 are positioned upon a gantry 510 for movement along the pre-determined path P in a direction largely (but not necessarily) perpendicular to the direction of the conveyor 230. The first access arm 501 is positioned between the conveyor 230 and the positioning station 450. The second access arm 502 is positioned between the positioning station 450 and assembly station 460. The third access arm 503 is positioned between the assembly station 460 and the gasket supply 470.

The access arms 500 each may have a number of gripper arms 520 to grab and release the lens molds 260, 280 and the gaskets 475. The gripper arms 520 may operate largely in the horizontal plane so as to grab the molds 260, 280 and the gaskets 475. The access arms 500 are controlled by the control system 120. The access arms 500 may be largely identical.

The first access arm 501 picks up the first lens mold 260 from the pallet 240 via the gripper arms 520. The lens molds 260, 280 positioned on the pallet 240 may be identified by the radio frequency tag. Likewise, the expected prescription also may be identified by the tag 295. The first access arm 501 travels along the gantry 510 to the positioning station 450. The positioning stage 480 rises to support the first lens mold 260. Once the gripper arms 520 release the lens mold 260, the positioning stage 480 then lowers so as to allow the first access arm 501 to return to the pallet 240 to pick up the second lens mold 280. The optical device 485 detects the tic marks 260 on the lens mold 260 such that the stage 480 may rotate the lens mold 260 under the direction of the control system 120 to ensure that the mold 260 is properly oriented. FIG. 6 shows a perspective view of the lens mold 260 with the indicator 430 and the tic mark 265 being viewed by the optical device 485.

Once the lens mold 260 has been inspected by the optical device 485 and positioned by the positioning stage 480, the second access arm 502 moves into position over the positioning station 450. The positioning stage 480 again rises and allows the first lens mold 260 to be captured by the gripper arms 520. The positioning stage 480 lowers and allows the second access arm 502 to travel to the assembly station 460. The assembly stage 495 rises to support the first lens mold 260 such that the gripper arms 520 may release the lens mold 260 onto the assembly stage 495. The assembly stage 495 then retracts within the gasket mount 490 to permit the second access arm 502 to return to the positioning station 450.

While the second access arm 502 transports the first lens mold 260 to the assembly station 460, the gripper arms 520 of the first access arm 501 grab the second lens mold 280 off of the pallet 240. The second access arm 502 transports the second lens mold 280 to the positioning station 450 where it is captured, inspected, and positioned in the same manner as described above with respect to the first lens mold 260.

Once the first lens mold 260 is positioned on the assembly stage 495 within the gasket mount 490, the gripper arms 520 of the third access arm 503 pick up a gasket 475 from the gasket supply 470. The third access arm 503 places the gasket 475 upon the gasket mount 490 in the assembly station 460. The assembly stage 495 then pushes the first lens mold 260 into place within the gasket 475 while the gasket 475 is held in place by the gripper arms 520. The position of the first lens mold 260 within the gasket 475 is determined by the control system 120 based upon the indicator 430 and/or the database 220 so as to manufacture the lens 110 with the desired prescription. The assembly stage 495 then retracts and the third access arm 503 removes the gasket 475 with the first lens mold 260 therein. The third access arm 503 travels down the gantry 510 a short distance so as to clear the assembly station 460.

The second access arm 503 then returns to the positioning station 450 to pick up the second lens mold 280. The second access arm 503 then transports the second lens mold 280 to the assembly stage 495 of the assembly station 460. Once the gripper arms 520 release the second lens mold 280, the assembly stage 495 retracts within the gasket mount 490 so as to allow the second access arm 502 to return to the positioning station 450. The third assembly arm 503 then repositions the gasket 475 with the first lens mold 260 therein back on the gasket mount 490. The gripper arms 520 of the third access arm 503 keep the gasket 475 in place as the assembly stage 495 pushes the second lens mold 280 into place within the gasket 475. The position of the second lens mold 280 within the gasket 475 is determined by the control system 120 based upon the desired prescription and the geometry of the specific mold.

The assembly stage 495 then retracts and the third access arm 503 transports the gasket 475 with the lens molds 260, 280 therein along the gantry 510 to a gasket pallet 560 positioned on a second conveyor system 570 that travels along the predetermined path P. A further method for assembling the lens molds 260, 280 is shown in patent application Ser. No. 09/026,310, entitled "*Method and Apparatus for Assembling a Lens Forming Device*", now allowed and incorporated herein by reference.

Figure 11:
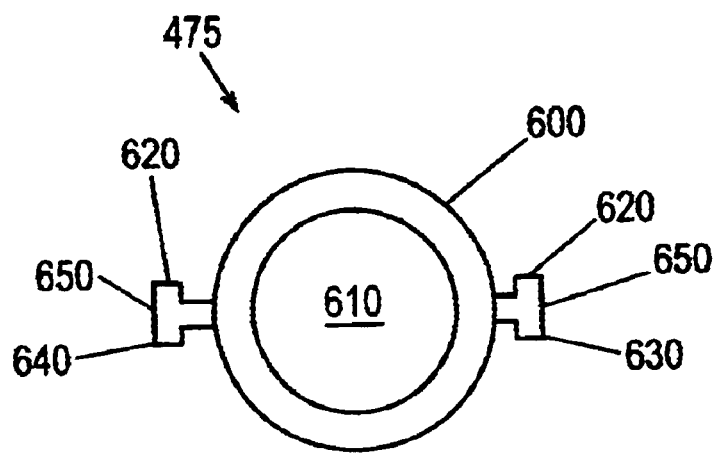
FIG. 11 is a top plan view of the gasket used in the present invention.
Figure 12:
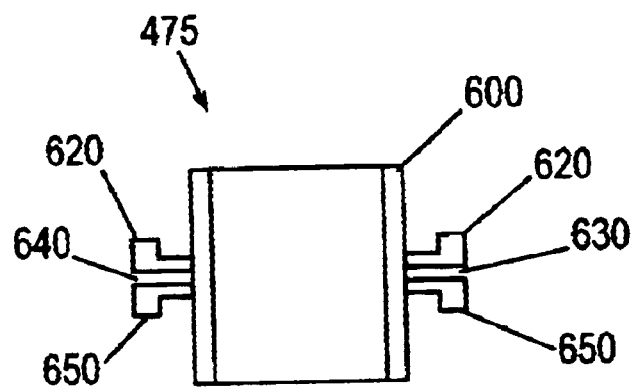
FIG. 12 is a side cross-sectional view of the gasket.
Figure 13:
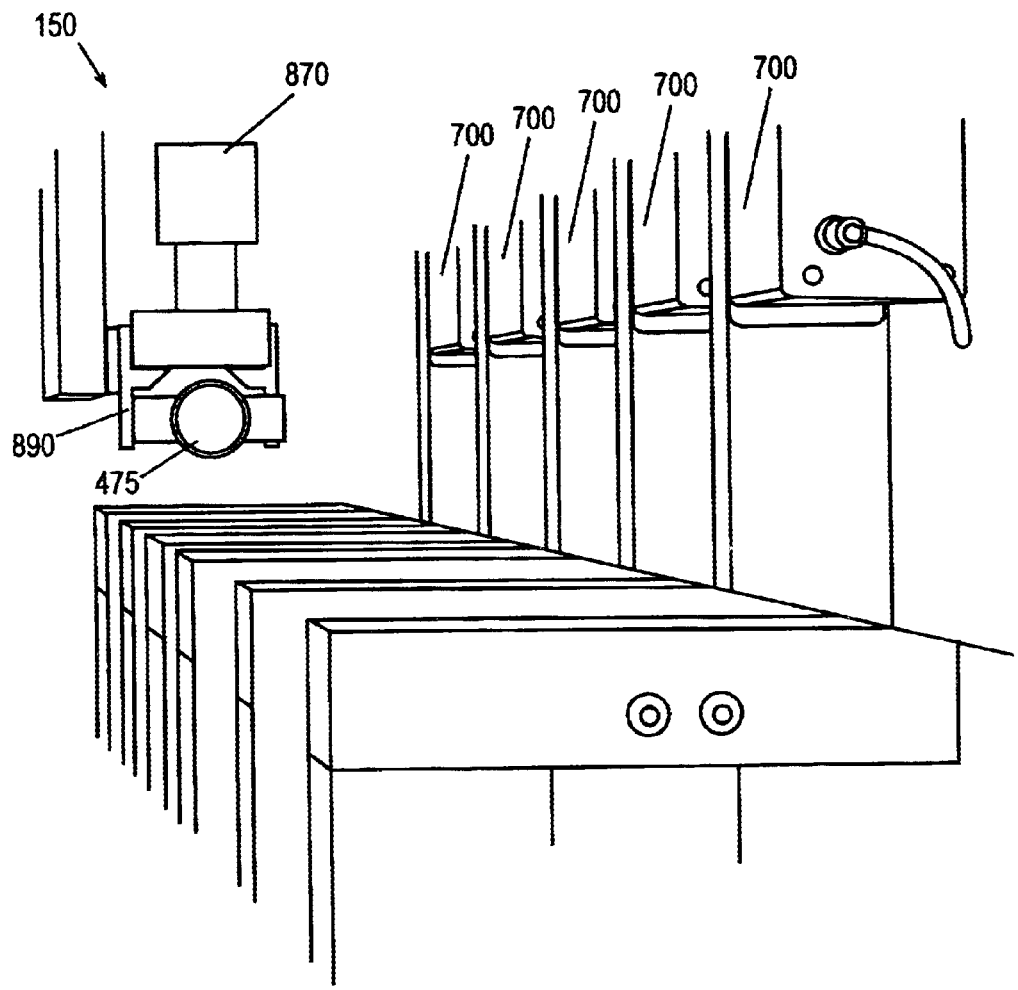
FIG. 13 is a perspective view of the fill and cure station of the present invention.
Figure 14:
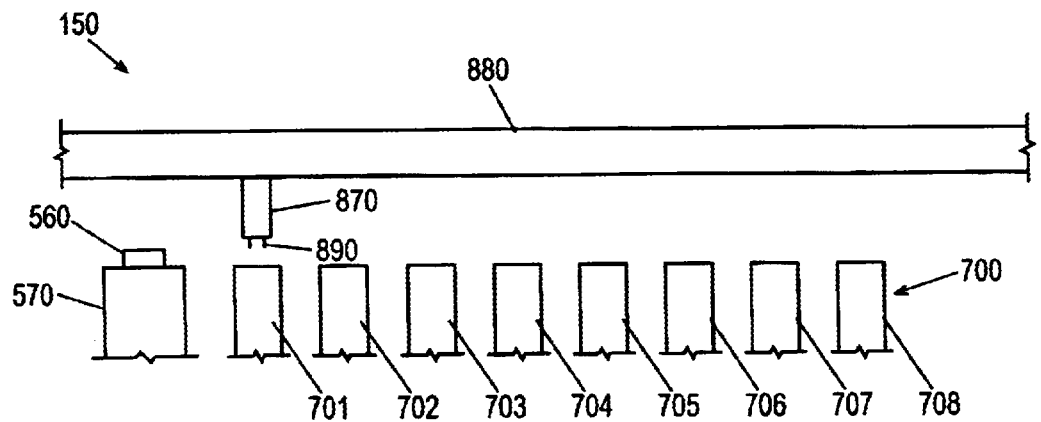
FIG. 14 is a side plan view of the fill and cure station.
Figure 15:
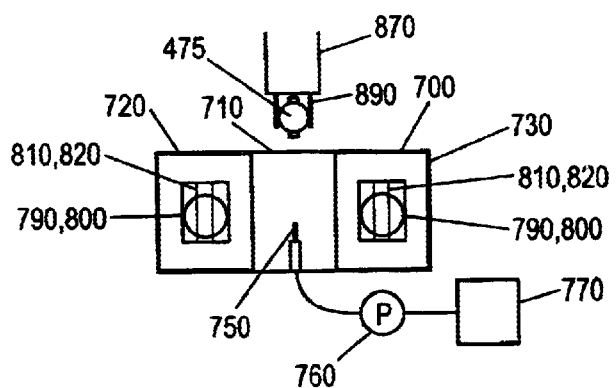
FIG. 15 is a side cross-sectional view of the fill and cure module.
Figure 16:
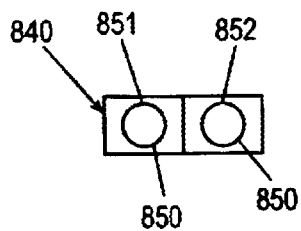
FIG. 16 is a side plan view of the gasket bracket for use in the fill and cure module.
Figure 11:
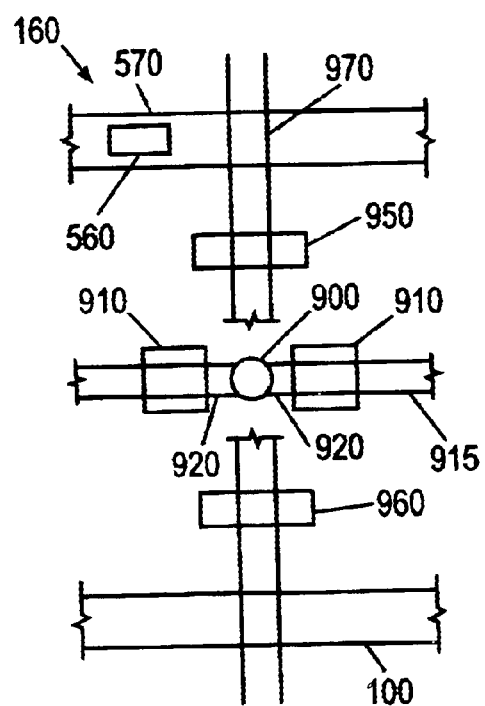

As is shown in FIGS. 11 and 12, the gasket 475 itself is generally a circular structure with an outer wall 600 defining an inner bore 610. At least one port 620 is positioned on the outer wall 600 for communication with the bore 610. Preferably the ports 620 on the outer wall 600 include a thin septum 630 on one end and an exhaust vent 640 positioned on the other end. These ports 630, 640 each may be positioned within a support bracket 650. The support brackets 650 may extend beyond the outer wall 600 and provide a structure for gripping the gasket 475. The gasket 475 itself is preferably made from a thermoplastic rubber compound or similar materials. A preferred gasket material is sold by The Thermoplastic Elastomers Division of GLS Corporation under the designation Dynaflex G2711 with Krayton G polymers. Another preferred gasket for use in the present application is described in U.S. patent application Ser. No. 09/025,903, entitled "*Gasket for Lens Making*", now allowed and incorporated herein by reference.

The Fill and Cure Station

The second conveyor 570 then carries the gasket palate 560 to the fill and cure station 150. The fill and cure station 150 is shown in FIGS. 13–16. The fill and cure station 150 includes a number of fill and cure modules 700. In this embodiment, eight (8) fill and cure modules 700 are used, modules 701, 702, 703, 704, 705, 706, 707, 708. Any number of modules 700 may be used. Each fill and cure module 700 has one fill station 710, a first cure station 720, and second cure station 730. The fill station 710 may have a pair of clamps positioned therein so as to hold each gasket 475 in place. The fill station 710 also has a non-coring needle 750 positioned therein for insertion into the septum 630 of the gasket 475. The needle 750 is in fluid communication with an external pump 760 and a source 770 of a polymeric lens material 780. The pump 760 preferably is a positive displacement pump. The pump 760 may be cylindrical in shape and driven by a servomotor, a stepper motor, or a similar device. The pump 760 also is preferably a multi-speed pump. The polymeric lens material 780 preferably is a monomer that is curable under ultraviolet light. A preferred polymeric lens material 780 may an acrylate oligomer or a similar type of material. Any conventional type of polymeric lens material 780, however, may be used.

The cure stations 720, 730 each may have a front ultraviolet light source 790 and a rear ultraviolet light source 800. Alternatively, visible light sources or infrared lights sources may be used. Preferably, ultraviolet light or visible light sources are used. The front ultraviolet light source 790 is covered with a front shutter 810 while the rear ultraviolet light source 800 is covered with a rear shutter 820. The spacing between the light sources 790, 800 is about three inches. Operations of the light sources 790, 800 and the shutters 810, 820 is controlled by the control system 120 depending upon the entered prescription. The shutters 810, 820 may be operated independently of one another. The ultraviolet light sources 790, 800 preferably can deliver radiation of approximately 1,400 millijoules per square centimeter of UV energy. At the position of the molds 260, 280, the intensity is between 0.5 and 20 mW/cm$^2$. The light sources 790, 800 are grid lamps from Jelight Corporation. These are low pressure mercury lamps coated with a phosphor to emit a certain spectra of light. At the peak wavelength, the intensity is typically between 1 and 5 mW/cm$^2$.

Each fill and cure module 700 may include a movable bracket 840 with two (2) gasket holders 850 therein, a first gasket holder 851 and a second gasket holder 852. The gasket holders 850 are sized to accept and support a gasket 475 therein. The bracket 840 maneuvers the individual gasket holders 851, 852 between the fill station 710 and the first and second cure stations 720, 730. Positioning of the bracket 840 within the modules 700 is controlled by the control system 120.

The fill and cure station 150 also includes at least one automated access arm 870. The access arm 870 is positioned on a gantry 880 for horizontal movement between the second conveyor 570 and the fill and cure modules 700. The access arm 870 also may have an extendable cylinder 885 for movement in the vertical direction. The extendable cylinder 885 may, in turn, include a pair of gripper arms 890 for grabbing and releasing the gasket 475. The extendable cylinder 880 and the gripper arms 890 are controlled by the control system 120.

The gripper arms 890 of the access arm 870 remove the gasket 475 with the lens molds 260, 280 therein from the gasket pallet 560. The access arm 870 moves along the gantry 880 to one of the fill and cure modules 700. In this example, the access arm 870 places the gasket 475 in the first gasket holder 851 of the bracket 840 within first full and cure module 701. At the time, the first gasket holder 851 is positioned within the fill station 710. The gasket 475 is positioned in the fill station 710 with the septum 630 end facing the needle 750. The gasket 475 may be held in place within the fill station 710 by a number of clamps or other means. The needle 790 is inserted into and punctures the septum 630.

The pump 760 then pumps the polymeric lens material 780 into the bore 610 of the gasket 475 from the polymeric material source 770. Any air within the bore 610 is forced out through the exhaust port 640. The rate of fill of the bore 610 is controlled by the control system 120. Early on, the fill rate is slow so as to avoid the encapsulation of bubbles therein. In the middle, the fill rate is increased to the maximum rate. The rate is again slowed towards the end of the fill so as to prevent overfilling the bore 610. The amount of the polymeric lens material 810 to be inserted within the bore 610 of the gasket 475 is controlled by the control system 120. On average, about 15 to 40 milliliters of material 810 may be inserted into the bore 610. Each prescription may have a different flow rate profile as to start, middle, and end rates. After filling is complete, the needle 750 is removed. The septum 630 preferably is self-sealing to prevent leakage.

After the bore 610 is filled and the needle 750 is removed, the bracket 840 slides the first gasket holder 851 with the gasket 475 therein either to the right or to the left and into the first or second cure station 720, 730. Once the gasket holder 851 is in place within the cure station 720, 730, the control system 120 opens the shutters 810, 820 so as to expose the polymeric lens material 780 within the bore 610 to the ultraviolet radiation. The control system 120 operates the light sources 790, 800 and the shutter 810, 820 independently such that the front and rear cure times may vary according to the prescription. The polymeric lens material 780 preferably cures in about ten (10) to about one hundred eighty (180) seconds. Some materials may take much longer to cure, depending upon the chemistry. The polymeric lens material 780 hardens to form the lens 110. As the polymeric lens material 780 hardens, the further indicator 448 positioned on the back mold 280 transfers onto the lens 110.

While the polymeric lens material 780 is curing within the first gasket holder 851 in, for example, the first cure station 720, the second gasket holder 852 of the bracket 840 is positioned within the fill station 710. Another gasket 475 maybe positioned therein by the access arm 870 and filled in the same manner as described above. Once the curing of the gasket 745 in the first cure station 720 is complete, the bracket 840 again shifts the first gasket holder 851 into the middle fill station 720 position. In doing so, the second gasket holder 852 is moved into the second cure station 730 for the curing process. Once the first gasket holder 851 is in the fill station 710, the access arm 870 removes the gasket 475. The access arm 870 removes the gasket 475 from the fill station 710 and places the gasket 475 on the gasket pallet 560 on the second conveyor 570. Another gasket 475 may then be placed within the fill station 710 and the process is repeated as described above.

The fill and cure station 150 may use optical or other types of sensors to indicate when the molds 260, 280 are full. These sensors may be used as a secondary or a primary indicator of complete fill. If the sensors are used as a secondary indicator, the sensors may be a backup in case the molds 260, 280 somehow get assembled incorrectly, leading to an incorrect volume for the desired lens 110. A further method for filling the gasket 475 with the polymeric lens material 780 is described in U.S. patent application Ser. No. 09/026,277, entitled *"Method and Apparatus for Filling a Lens Forming Device with a Curable Fluid"*, now allowed and incorporated herein by reference. A further method for curing the polymeric lens material 780 is described in U.S. patent application Ser. No. 09/026,222, entitled *"Method for Curing a Lens Forming Fluid"*, now allowed and incorporated herein by reference.

The Degasketing Station

Figure 18:
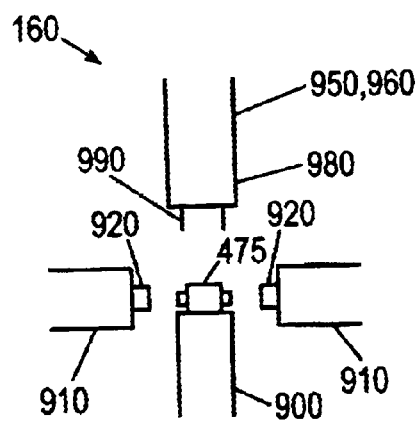
FIG. 18 is a side plan view of the degasketing station.
Figure 19:
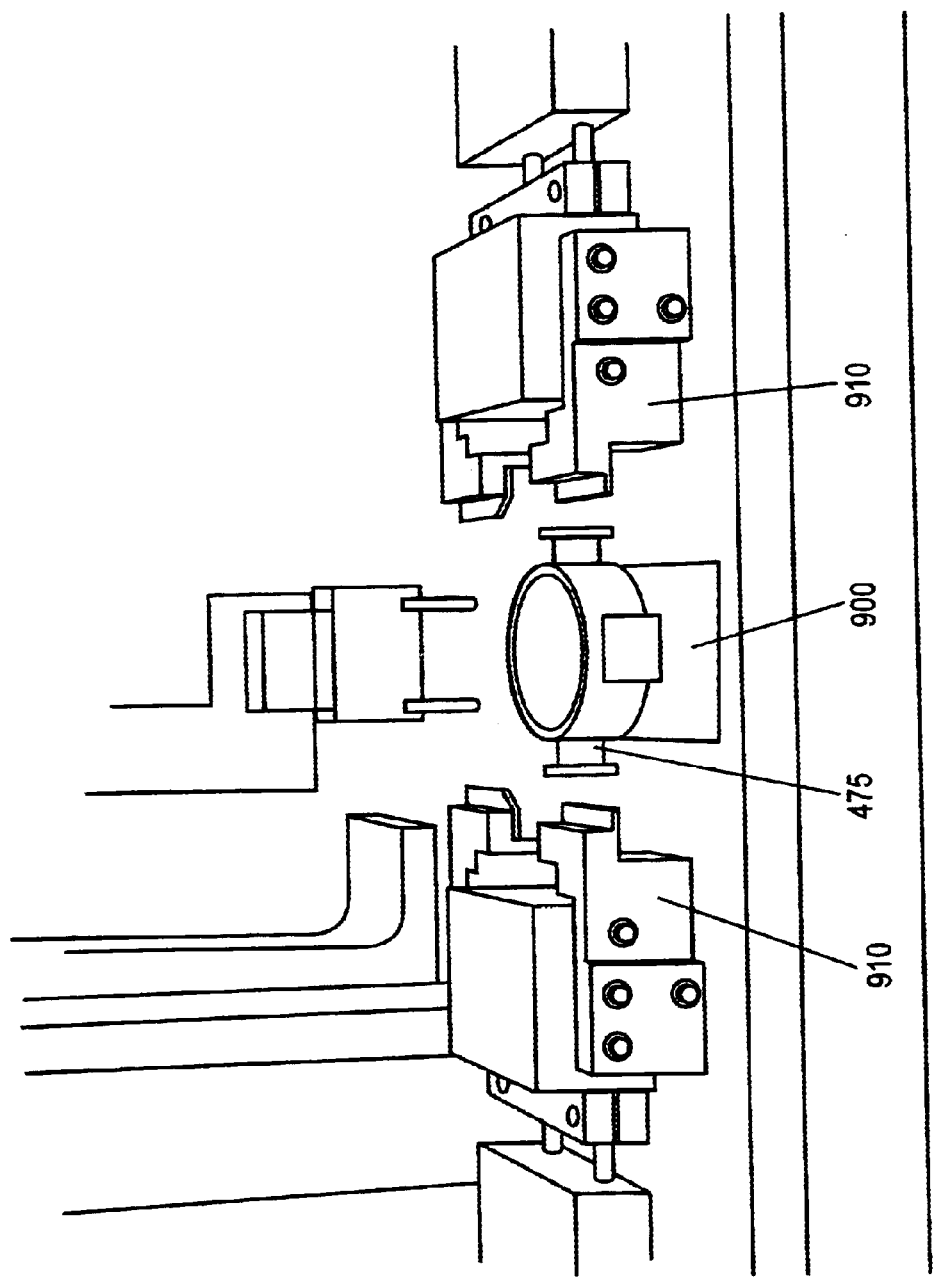
FIG. 19 is a perspective view of the degasketing station.

The second conveyor 570 transports the gasket 475 along the predetermined path P to the degasketing station 160. The degasketing station 160 is shown in FIGS. 17–19. The degasketing station 160 may include an extendable plunger 900 surrounded by a pair of movable degasketing arms 910. The degasketing arms 910 may be movable towards and away from the plunger 900 along a pair of rails 915 or a similar type of structure. Each degasketing arm 910 may have a pair of gripper arms 920 thereon so as to grab the gasket 475. The degasketing arms 910 and the gripper arms 920 are operated by the control system 120. The degasketing station 160 also may include a first automated access arm 950 and a second automated access arm 960. Both of the access arms 950, 960 may be positioned on a gantry 970 for movement thereon along the predetermined path P in a direction that may be perpendicular to the direction of the second conveyor 570. The access arms 950, 960 may further include an extendable cylinder 980 for vertical movement and a pair of gripper arms 990 for horizontal movement. The access arms 950, 960 are controlled by the control system 120.

The gripper arms 990 of the first access arm 950 may pick up the gasket 475 from the second conveyor 570 and place it on the plunger 900. The gripper arms 920 of the degasketing arms 910 then secure the gasket 475 by grabbing it by the support brackets 650. The first access arm 950 then returns to the second conveyor to pick up the next gasket 475. The degasketing arms 910 then retract away from the plunger 900 so as to stretch the gasket 475. Once the gasket 475 is stretched, the plunger 900 rises so as to force the combined lens molds 260, 280 and the lens 110 out of the gasket 475. The gripper arms 990 of the second access arm 960 then grab the combined lens molds 260, 280 and the lens 110 and place them on a finishing conveyor 1000 traveling along the predetermined path P. The gasket 475 may then be removed, and preferably, recycled.

The Demolding and Finishing Station

Figure 20:
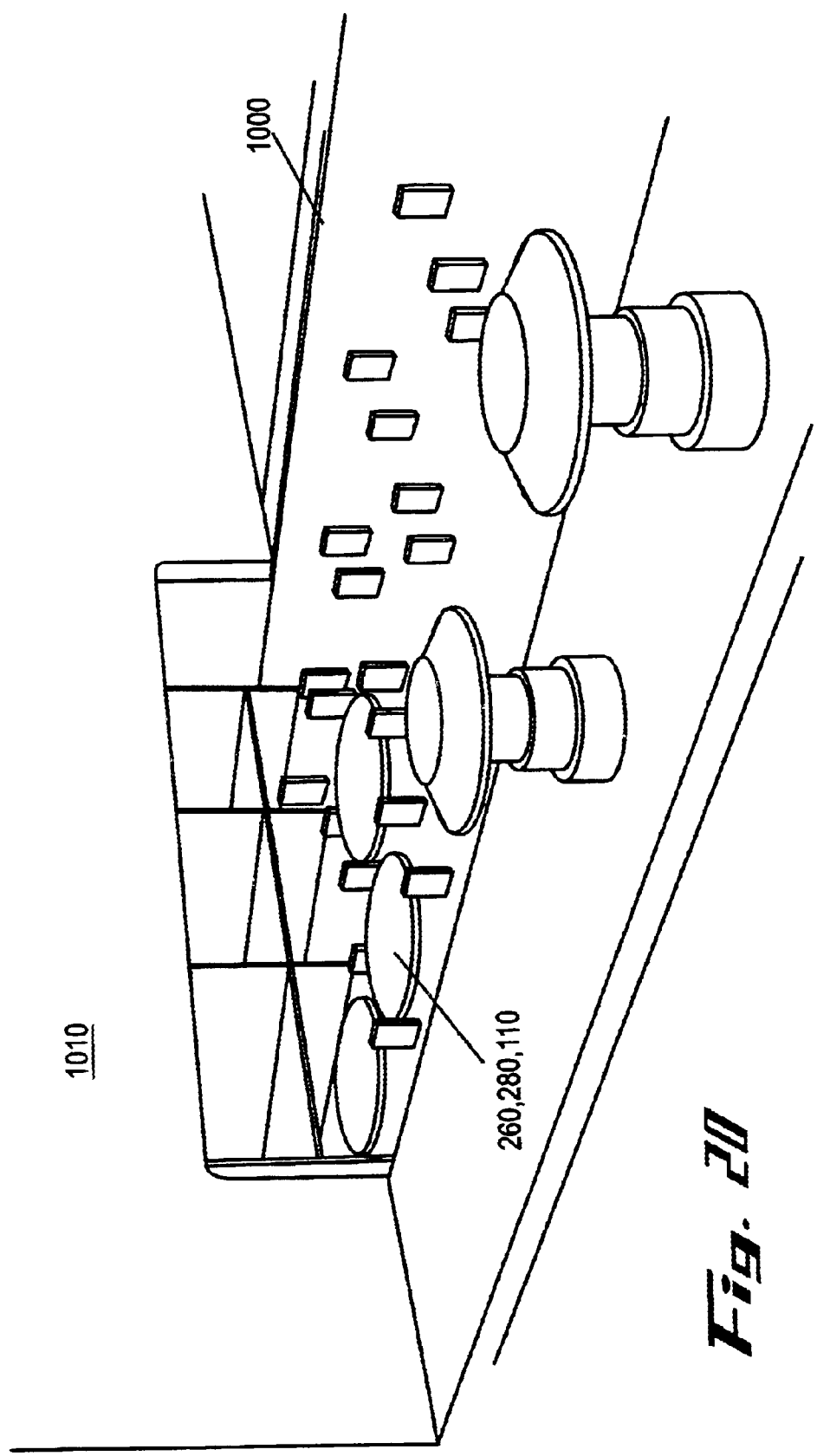
FIG. 20 is a perspective view of the demolding and station of the present invention.
Figure 21:
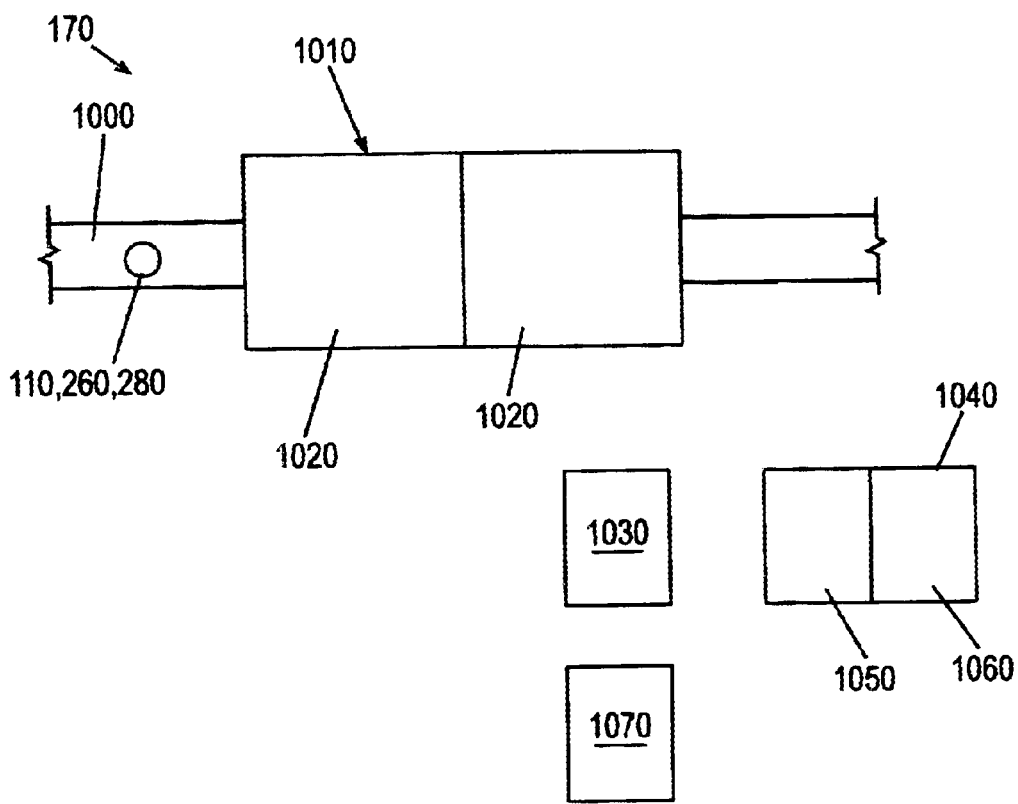
FIG. 21 is a top plan view of the demolding and finishing station.

The finishing conveyor 1000 carries the combined molds 260, 280 and the lens 110 to the demolding and finishing station 170. The demolding and finishing station 170 is shown in FIGS. 20–21. The demolding and finishing station 170 may include a housing 1010 with a number of heating and cooling stations 1020 therein. The combined lens molds 260, 280 and the lens 110 pass through the housing 1010 along the finishing conveyor 1000 or another conveyor-type structure. Differences in the thermal expansion characteristics of the molds 260, 280 and the lens 110 cause the lens 110 to separate from the mold 260, 280.

Figure 22:
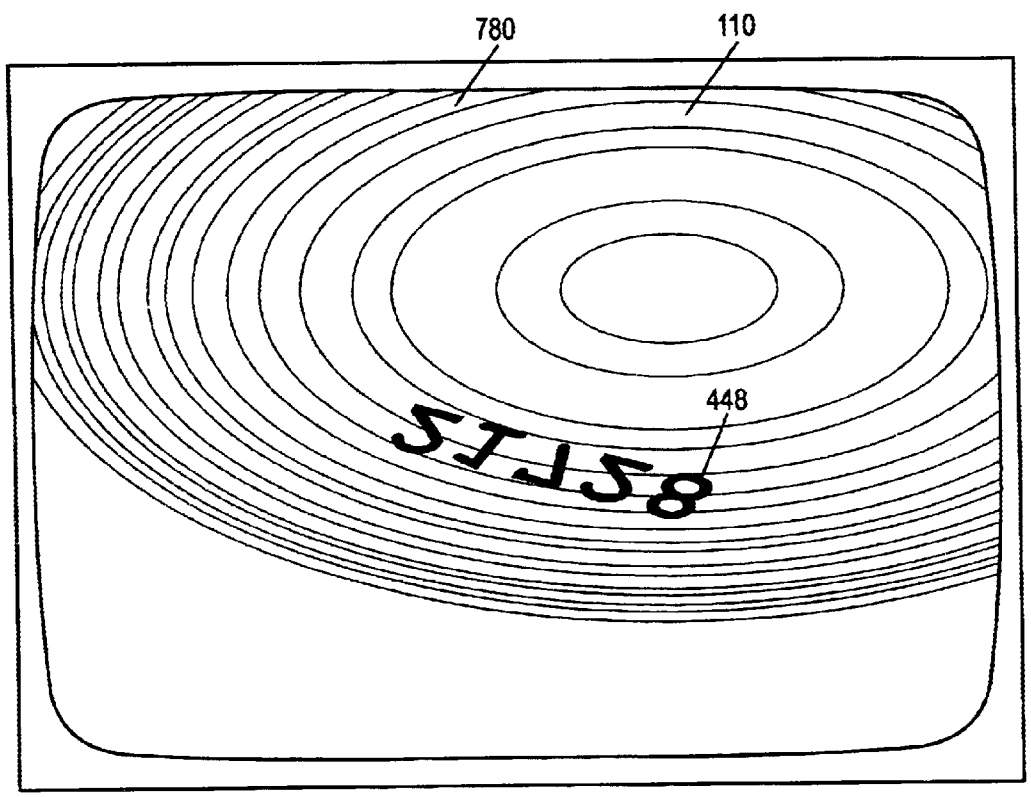
FIG. 22 is a perspective view of the lens as manufactured in the present invention.

The lens 110 may then be removed and treated further in a conventional manner. Specifically, the lens 110 may be carried through a scratch coating stations 1030. The lens 110 may be dipped in a lacquer type coating that is thermally annealed to ensure bonding to the surface of the lens 110. Other coating methods or materials are also possible, such as spin, spray, or vacuum coating. Ultraviolet coating, chemical vapor deposition coating, or plasma-applied coatings also are possible. The lens 110 then may be transported to a verification station 1040. As is shown in FIG. 22, the verification station optically verifies that the lens 110 matches the intended prescription. The verification station 1040 includes both an optical scanner 1050 to verify the prescription and a barcode scanner 1060 to ensure that the correct lens 110 is present. The lens 110 may then be packed and shipped to the customer.

The molds 260, 280 may be removed from the finishing station 170 and transported to a cleaning station 1070. The cleaning station 1070 ensures that the lenses 260, 280 are free of any monomer residue or other contaminates. After cleaning, the molds 260, 280 may be reintroduced to the storage and retrieval station 130 for positioning on the carousel 300 and reuse.

Example of Use

By way of example, a lens prescription may be entered into the control system 120 via the keyboard 210 or via any other type of conventional data input/output means. Based upon this prescription, the control system 120 selects the appropriate lens molds 260, 280 and determines where on the storage carousel 300 these molds 260, 280 may be located. The control system 120 also determines the size and shape of the lens 110, i.e., the lens center thickness in terms of the depth of the first mold lens 260 within the gasket 475 in relationship to the depth of the second lens mold 280 within the gasket 475. The control system 120 determines the front and rear mold machine axis, i.e., the required positioning of the tic mark 265 as viewed by the optical device 485 of the positioning station 450. The control system 120 then determines the fill rate profile for the polymeric lens material 780 in the bore 610 in the fill and cure station 150 in terms of the start fill rate, the mid fill rate, and the end fill rate and in terms of speed and percentage of volume for each. The total volume of material 780 needed to fill the bore 610 also is determined. The control system 120 then determines the start time for the front ultraviolet light source 790, the start time for the rear ultraviolet light source 800, the timing of the shutters 810, 820, and the cure time in seconds to cure the lens 110 with the light sources 790, 800. With the given prescription, the lens center thickness may be about one (1) to about ten (10) millimeters, the amount of polymeric lens material 780 may be about 15 to 40 milliliters, and the time to cure the material 780 may be about 10 to 180 seconds.

The manufacturing information on each prescription is preferably located in the database 220 of the control system 120 and/or on the indicator 430 of each mold 260, 280. Alternatively, each manufacturing parameter for the lens 110 may be entered and set individually as needed.

Based upon this information, the control station 120 activates the storage carousel 300 to align the mold storage location 340 with the access arm 350. The access arm 350 removes the appropriate lens mold 260 from its storage location 340 and places it in the basin 270 on the pallet 240. This process is then repeated with the second lens mold 280.

The control system 120 then activates the conveyor system 230 to bring the pallet 240 to the pre-orient and print station 135. The access arm 440 grasps the first lens mold 260 and removes it from the pallet 240. The optical device 444 reads the indicator 430 on the lens mold 260 to inform the control system 120 that the correct mold 260 is present. The optical device 444 also may obtain the manufacturing parameters from the indicator 430. The access arm 440 returns the first lens mold 260 to the pallet 240 and then removes the second lens mold 280. The optical device 444 again reads the indicator 430 thereon and informs the control system 120 that the correct mold 280 is present. Again, the optical device 444 also may obtain the manufacturing parameters from the indicator 430. One or more tic marks 265 may be present on the mold 280 so as to determine the orientation of the mold 260 and the desired amount of rotation. The optical device 444 may recognize the orientation of the tic marks 265. The gripper arms 443 of the access arm 440 then may rotate the second lens mold 280 to prepare it for printing. The printer 445 prints the further indicator 448 on the lens mold 280 in a predetermined location. The access arm 440 then returns the second lens mold 280 to the pallet 240.

The conveyor 230 then carries the pallet 240 to the positioning and assembly station 140. The lens molds 260, 280 may be identified via the radio frequency tag 295 on the pallet 295. The first access arm 501 grabs the first lens mold 260 and carries it to the positioning station 450. The positioning stage 480 then rotates the lens mold 260 in accordance with the detected tic mark 265 to its proper location. The second access arm 502 then picks up the first lens mold 260 and carries it to the assembly station 460. Meanwhile, the first access arm 501 picks up the second lens

280 from the pallet 240 and carries it to the positioning station 450 where it is also verified and properly rotated into position.

The assembly stage 495 lowers the first lens mold 260 within the gasket mount 490 while the third access arm 503 moves a gasket 475 from the gasket source 470 on to the gasket mount 490. The assembly stage 495 pushes the first lens mold 260 into the proper position within the gasket 475 as determined by the control system 120. The third access arm 503 removes the gasket 475 from the assembly station 460. The second access arm 502 then travels to the positioning station 450 and picks up the second lens mold 280. The second access arm 502 transports the second lens mold 280 onto the assembly stage 495. The assembly stage 495 withdraws within the gasket mount 490 while the third access arm 503 places the gasket 475 onto the gasket mount 490. The assembly stage 495 pushes the second lens mold 280 into the gasket 475 to the depth determined by the control system 120. The third assembly arm 503 then picks up the gasket 475 and places it on the gasket pallet 560 on the second conveyor 570.

The second conveyor 570 carries the gasket 475 to the fill and cure station 150. The access arm 870 picks up the gasket 475 and places it within one of the modules 700 of the fill station 710. The needle 750 of the fill station 710 penetrates the septum 630 of the gasket 475. The needle 750 inserts the polymeric lens material 780 into the bore 610 of the gasket 475 at the varying fill rate determined by the control system 120. Once the bore 610 has been filled with the predetermined volume of material 780, the needle 750 is withdrawn and the gasket 475 is placed in one of the cure stations 720, 730. The shutters 810, 820 are opened and closed as determined by the control system 120. The gasket 475 is subject to the ultraviolet radiation for the predetermined amount of time so as to form the lens 110. The further indicator 448 transfers to the lens 110 in the curing process. The access arm 870 then removes the gasket 475 from the fill station 710 and places the gasket 475 on the gasket pallet 560 on the second conveyor 570.

The second conveyor 570 transports the gasket 475 to the degasketing station 160. The first access arm 950 picks up the gasket 475 from the second conveyor 570 and places it on the plunger 900. The degasketing arms 910 secure the gasket 475 along the support brackets 650. The degasketing arms 910 stretch the gasket 475 while the plunger 900 forces the lens 110 and the molds 260, 280 out of the gasket 475. The second access arm 960 then grabs the combined lens 110 and the molds 260, 280 and places them on the finishing conveyor 1000.

The finishing conveyor 1000 carries the combined lens 110 and the molds 260, 280 to the demolding and finishing station 170. The finishing station 170 separates the lens 110 and the mold 260, 280 by a number of heating and cooling stations 1020. The lens 110 may then be separated from the molds 260, 280 and further treated in a conventional manner. This treatment may include surface bonding, cleaning, coating, optical verification, and shipping. The molds 260, 280 are removed and sent through the cleaning station 1070. The molds 260, 280 are then reintroduced to the storage and retrieval station 130 for further use.

Given the method and apparatus of the present invention, the lens 110 may be produced in about fifteen (15) to about forty-five (45) minutes. This includes the time from the point at which the control system 120 activates the storage and retrieval station 130 until the point the lens 110 emerges from the heating and cooling stations 1020 of the finishing station 170. In continuing use, the system 100 of the present invention may produce about 300 to 400 lenses 110 an hour. The system 100 may be able to produce two to ten million different prescriptions or more.

It should be apparent that the foregoing relates only to the preferred embodiments of the present invention and that numerous changes and modifications may be made herein without departing from the spirit and scope of the invention as defined by the following claims.

We claim:

1. An apparatus for manufacturing a lens with a predetermined prescription from a plurality of lens molds, a gasket, and a source of a fluid material, said apparatus comprising:
    a means for selecting a first lens mold and a second lens mold from said plurality of lens molds based upon said predetermined prescription;
    a means for positioning said first lens mold and said second lens mold within said gasket based upon said predetermined prescription;
    a means for inserting a predetermined amount of said fluid materials within said gasket and between said first lens mold and said second lens mold based upon said predetermined prescription;
    a means for curing said fluid material so as to form said lens based upon said predetermined prescription; and
    a means for advancing said first lens mold and said second lens mold along a predetermined path through said selecting means, said positioning means, said inserting means, and said cure means.

2. The apparatus of claim 1, further comprising a control system for operating said selecting means, said positioning means, said inserting means, and said cure means.

3. The apparatus of claim 2, wherein said control system comprises a personal computer.

4. The apparatus of claim 2, wherein said control system comprises a database.

5. The apparatus of claim 2, wherein said control system comprises a means for input and output of data.

6. The apparatus of claim 2, wherein said selecting means comprises a conveyor advancing along said predetermined path.

7. The apparatus of claim 6, wherein said selecting means comprises one or more transport pallets positioned along said conveyor.

8. The apparatus of claim 7, wherein said selecting means comprises a storage carousel for storing said plurality of lens molds.

9. The apparatus of claim 8, wherein said selecting means comprises an automated access arm for transporting said first lens mold and said second lens mold from said storage carousel to said pallet.

10. The apparatus of claim 9, wherein said access arm comprises a gantry for movement thereon.

11. The apparatus of claim 9, wherein said access arm comprises a plurality of gripper heads.

12. The apparatus of claim 11, wherein each of said plurality of gripper heads comprises a plurality of gripper arms for gripping said first lens mold and said second lens mold.

13. The apparatus of claim 11, wherein each of said plurality of gripper heads comprises an optical device.

14. The apparatus of claim 13, wherein said optical device comprises a fiber optic sensor.

15. The apparatus of claim 2, wherein said positioning means comprises a positioning station.

16. The apparatus of claim 15, wherein said positioning station comprises an optical device and wherein each of said plurality of lens molds comprises a tic mark positioned thereon for detection by said optical device.

17. The apparatus of claim 16, wherein said optical device comprises a camera-based vision system.

18. The apparatus of claim 16, wherein said positioning station comprises a positioning stage for rotating said first lens mold and said second lens mold according to said tic mark.

19. The apparatus of claim 15, wherein said positioning means comprises an assembly station.

20. The apparatus of claim 19, wherein said assembly station comprises a retractable assembly stage such that said assembly stage can insert said first lens mold within said gasket at a first predetermined depth and insert said second lens mold within said gasket at a second predetermined depth.

21. The apparatus of claim 19, wherein said assembly station comprises a gasket mount positioned about said assembly stage.

22. The apparatus of claim 19, wherein said positioning means comprises a gasket supply with a plurality of said gaskets.

23. The apparatus of claim 22, wherein said positioning means comprises one or more access arms for maneuvering said first lens mold, said second lens mold, and said gasket therethrough.

24. The apparatus of claim 23, wherein said one or more access arms comprise a first access arm for positioning said first lens mold and said second lens mold on said positioning station, a second access arm for maneuvering said first lens mold and said second lens mold between said positioning station and said assembly station, and a third access arm for maneuvering said gasket between said gasket supply and said assembly station and for removing said first lens mold, said second lens mold, and said gasket from said assembly station.

25. The apparatus of claim 23, wherein said one or more access arms comprise a gantry for movement thereon.

26. The apparatus of claim 23, wherein said one or more access arms comprise a pair of gripper arms for gripping said first lens mold, said second lens mold, and said gasket.

27. The apparatus of claim 2, wherein said inserting means comprises one or more fill stations.

28. The apparatus of claim 27, wherein said one or more fill stations comprise a needle for piercing said gasket.

29. The apparatus of claim 27, wherein said one or more fill stations comprise a pump in communication with said source of fluid material and said gasket.

30. The apparatus of claim 29, wherein said pump comprises a variable speed pump such that said pump supplies said fluid material to said gasket at multiple rates.

31. The apparatus of claim 27, wherein said inserting means comprises one or more access arms.

32. The apparatus of claim 2, wherein said cure means comprises one or more cure stations.

33. The apparatus of claim 32, wherein said one or more cure stations comprise one or more radiation sources.

34. The apparatus of claim 33, wherein said one or more radiation sources comprise one or more ultraviolet or visible light sources.

35. The apparatus of claim 34, wherein said one or more radiation sources comprise a first radiation source and a second radiation source.

36. The apparatus of claim 33, wherein said one or more radiation sources comprise one or more shutters.

37. The apparatus of claim 36, wherein said one or more shutters comprise a first shutter and a second shutter and wherein said control system operates said first shutter and said second shutter independently of one another.

38. The apparatus of claim 2, further comprising a means for identifying said first lens mold and said second lens mold.

39. The apparatus of claim 38, wherein said identifying means comprises an access arm positioned along said predetermined path to grasp said first lens mold and said second lens mold.

40. The apparatus of claim 39, wherein said first lens mold and said second lens mold each comprise an indicator thereon and wherein said identifying means comprises an optical device so as to read said indicator.

41. The apparatus of claim 40, wherein said optical device comprises a bar code reader.

42. The apparatus of claim 39, wherein said first lens mold and said second lens mold each comprise one or more tic marks, said one or more tic marks indicating the orientation of said first lens mold and said second lens mold, and wherein said optical device comprises a camera-based vision system such that said optical device can determine the orientation of said first lens mold and said second mold.

43. The apparatus of claim 42, wherein said access arm comprises one or more gripper arms such that said gripper arms can grasp said first lens mold and said second lens mold and also rotate said first lens mold and said second lens mold.

44. The apparatus of claim 39, wherein said access arm comprises a printer thereon so as to print a further indicator on said first lens mold or said second lens mold.

45. The apparatus of claim 2, further comprising a means for removing said lens and said first lens mold and said second lens mold from said gasket, said removing means positioned along said predetermined path.

46. The apparatus of claim 45, wherein said removing means comprises a pair of movable degasketing arms, said pair of movable degasketing arms capable of grabbing and stretching said gasket.

47. The apparatus of claim 46, wherein said removing means comprises an extendable plunger, said extendable plunger capable of pushing said lens and said first lens mold and said second lens mold out of said gasket.

48. The apparatus of claim 47, wherein said removing means comprises one or more access arms for placing said gasket with said lens, said first lens mold, and said second lens mold therein on said plunger and for removing said lens, said first lens mold, and said second lens mold from said plunger.

49. The apparatus of claim 2, further comprising a means for separating said lens, said first lens mold, and said second lens mold.

50. The apparatus of claim 49, wherein said separating means comprises a plurality of heating and cooling stations.

51. The apparatus of claim 1, further comprising a means for coating said lens with a scratch resistant treatment.

52. The apparatus of claim 1, further comprising a means for verifying said predetermined prescription of said lens.

53. The apparatus of claim 1, further comprising a means for cleaning said first and second lens molds.

54. A method for manufacturing a lens with a predetermined prescription from a plurality of lens molds, a gasket, and a source of a fluid material, said method comprising the steps of:

selecting a first mold and a second mold from said plurality of lens molds based upon said predetermined prescription;

advancing said first lens mold along a predetermined path;

positioning said first lens mold within said gasket based upon said predetermined prescription;

advancing said second lens mold along said predetermined path;

positioning said second lens mold within said gasket based upon said predetermined prescription;

advancing said first lens mold, said second lens mold, and said gasket along said predetermined path;

inserting a predetermined amount of said fluid material within said gasket and between said first lens mold and said second lens mold based upon said predetermined prescription; and curing said fluid material so as to form said lens based upon said predetermined prescription.

* * * * *